(12) United States Patent
Kobayashi et al.

(10) Patent No.: US 8,276,473 B2
(45) Date of Patent: Oct. 2, 2012

(54) SIFT-DRUM APPARATUS AND FOUR WHEELED VEHICLE WITH THE SAME

(75) Inventors: Yasutaka Kobayashi, Akashi (JP); Ayumi Hamada, Akashi (JP)

(73) Assignee: Kawasaki Jukogyo Kabushiki Kaisha, Hyogo (JP)

(*) Notice: Subject to any disclaimer, the term of this patent is extended or adjusted under 35 U.S.C. 154(b) by 367 days.

(21) Appl. No.: 12/649,766

(22) Filed: Dec. 30, 2009

(65) Prior Publication Data
US 2011/0155497 A1 Jun. 30, 2011

(51) Int. Cl.
*G05G 5/08* (2006.01)
(52) U.S. Cl. .................. 74/337.5; 74/473.25
(58) Field of Classification Search ............. 74/337.5, 74/473.24, 473.25
See application file for complete search history.

(56) References Cited

U.S. PATENT DOCUMENTS

| | | | |
|---|---|---|---|
| 7,600,446 B2 * | 10/2009 | Mizuno et al. ............ 74/473.1 |
| 7,752,936 B2 * | 7/2010 | Kobayashi et al. ......... 74/337.5 |
| 7,770,481 B2 * | 8/2010 | Takemoto et al. .......... 74/337.5 |
| 7,966,902 B2 * | 6/2011 | Sotani et al. ............. 74/335 |
| 8,042,420 B2 * | 10/2011 | Tsunashima et al. ....... 74/337.5 |

FOREIGN PATENT DOCUMENTS

JP 2515958 7/1996

* cited by examiner

*Primary Examiner* — Ha D. Ho
(74) *Attorney, Agent, or Firm* — Wenderoth, Lind & Ponack, LLP

(57) ABSTRACT

A shift-drum apparatus for a gear-type transmission including a plurality of shift forks and a shift drum provided at its outer peripheral surface with a plurality of shift grooves, in which a state of the gear-type transmission is shifted between a neutral state and a plurality of transmission gear stages. The number of shift forks is the same as the number of the transmission gear stages, and each of the shift grooves includes one or more gear-shifting recesses that are depressed in an axial direction of the shift drum. The shift forks are biased in the axial direction respectively by springs toward the corresponding gear-shifting recesses. Two of the gear-shifting recesses are formed in at least one of the shift grooves, while two of the shift forks are engaged with the shift groove.

6 Claims, 10 Drawing Sheets

SIFT-DRUM APPARATUS AND FOUR WHEELED VEHICLE WITH THE SAME

BACKGROUND OF THE INVENTION

1. Field of the Invention

The present invention relates to a shift-drum apparatus for changing the speed of a gear-type transmission, and to a four wheeled vehicle with the shift-drum apparatus.

2. Description of the Related Art

FIG. 13 is a development view of a conventional shift-drum apparatus of a gear-type transmission. A plurality of bent shift grooves (cam grooves) 201 and 202 are formed in an outer peripheral surface of a shift drum 200, and drive pins of shift forks 203 and 204 are engaged with the shift grooves 201 and 202, respectively. When the shift drum 200 rotates, the shift forks 203 and 204 move in an axial direction (axial direction O2) of the shift drum 200 by a cam effect of side surfaces of the shift grooves 201 and 202, and a transmission gear stage of the gear-type transmission is shifted to a desired transmission gear stage.

More specifically, when the shift drum 200 is at a forward high speed position H, the one shift fork 204 moves toward one side in the axial direction (axial direction O2) of the shift drum 200, i.e., in a direction of an arrow K1 by the cam effect of the one shift groove 202, thereby coupling a corresponding dog clutch (not shown). When the shift drum 200 is at a forward low speed position L, the other shift fork 203 moves in a direction K1 by a cam effect of the other shift groove 201, thereby coupling a corresponding dog clutch (not shown). When the shift drum 200 is at a reverse position R, the other shift fork 203 moves toward the other side of the axial direction (axial direction O2) of the shift drum 200, i.e., in a direction of an arrow K2 by the cam effect of the other shift groove 201, thereby coupling a corresponding dog clutch (not shown).

However, in the shift operation, tip ends of dog teeth of corresponding dog clutches abut against each other in some cases. In such a case, it is difficult to swiftly complete the shifting action. Especially in the case of a vehicle having a centrifugal clutch, since power to the gear-type transmission is cut off at the time of idling and an input shaft of the gear-type transmission is stopped, the shifting action can not be completed in some cases.

Apart from the above-described shift-drum apparatus, Japanese Patent No. 2515958 discloses another shift-drum apparatus in which a shift drum is biased in a rotating direction by a spring so that a waiting function is exhibited. That is, even if tip ends of dog teeth abut against each other at the time of shifting operation, the waiting function is exhibited by the spring, and after both the dog teeth relatively rotate, the shift drum is rotated by the spring and the dog clutches are meshed with each other. However, the waiting function for biasing the shift drum in the rotating direction requires an extremely strong spring tension while taking, into account, inertial mass of the shift drum, friction of a rotation bearing and rotation speed, and an operation load of a shift operating lever is increased.

FIG. 14 shows a shift-drum apparatus having another waiting function described in Japanese Patent No. 251598. A gear-type transmission that is operated by this shift-drum apparatus can shift gears between neutral, a forward high speed stage, a forward low speed stage and a reverse stage. Two shift grooves 301 and 302 are formed in an outer peripheral surface of a shift drum 300.

A reverse cam portion (bent portion) 301R that is bent in an axial direction, and a forward low speed recess 301L that is depressed in the axial direction are formed in the one shift groove 301. A forward high speed cam portion 302H that is bent in the axial direction is formed in the other shift groove 302. A shift fork 303 that is engaged with the one shift groove 301 is biased toward the recess 301L (in the direction of an arrow K1) in the axial direction by a spring (not shown) and with this, the waiting function is exhibited when shifting to the forward low speed stage.

According to the shift drum 300 shown in FIG. 14, the one shift groove 301 has the forward low speed recess 301L having the waiting function, and the reverse cam portion (bent portion) 301R as described above, but since the forward low speed dog clutch and the reverse dog clutch are engaged and disengaged using the one shift fork 303, the shift drum has the following problem.

When shifting from the forward low speed stage to the reverse stage for example, it is necessary to once return the shift fork 303 to a neutral position N from the forward low speed position L and then to shift the shift fork 303 to the reverse position (301R). That is, it is necessary to secure a necessary rotating angle of the shift drum 300 in two stages, and a stroke of a driver's manual shift lever operation is increased, and if the operation stroke is shortened, an operation load is increased.

SUMMARY OF THE INVENTION

The present invention has been accomplished in view of the above circumstances, and it is an object of the invention to provide a shift-drum apparatus in which an excessive load is not applied to parts of an operating system irrespective of states of the gear-type transmission, the number of parts is not increased so much, shifting operation can smoothly be carried out, and an operation amount is substantially equal no matter which transmission gear stage a driver selects.

To achieve the above object, the present invention provides a shift-drum apparatus for a gear-type transmission including a shift drum provided at its outer peripheral surface with a plurality of shift grooves, and a plurality of shift forks that are respectively engaged with the shift grooves while being moved in an axial direction of a shift drum shaft by rotation of the shift drum, in which a plurality of dog clutches of the gear-type transmission are engaged or disengaged by movement of each of the shift forks, and a state of the gear-type transmission is shifted between a neutral state and a plurality of transmission gear stages, wherein the number of the shift forks is the same as the number of the transmission gear stages, each of the shift grooves includes a passage portion extending along a circumferential direction of the shift drum, and one or more gear-shifting recesses that are depressed from the passage portion in an axial direction of the shift drum, the shift forks are biased in the axial direction respectively by springs toward the corresponding gear-shifting recesses, two of the gear shifting recesses are formed in at least one of the plurality of shift grooves, while two of the shift forks are engaged with the shift groove.

According to the above structure, since the waiting function utilizing the recess and the spring that acts in the axial direction is exhibited in all of the transmission gear stages, no matter which transmission gear stage a driver selects and even if the tip ends of the dog teeth abut against each other, the shifting operation is smoothly completed by a comfortable and light shifting operation.

Further, since two of the gear shifting recesses are formed in one of the shift grooves while two of the shift forks are engaged with the shift groove, the number of shift grooves formed in the outer peripheral surface of the shift drum can be reduced, and the size of the shift drum in the axial direction can also be reduced. Further, since the rotating angle (stroke) of the shift drum, when the shift is operated, can be set substantially uniformly, the shifting operation of the transmission gear stages can be carried out by the same feeling, and the shifting operation becomes comfortable. That is, a rotating angle of the shift drum by one shifting operation does not become much greater than a rotating angle of other shifting operations, and the operating load is not increased.

In the shift-drum apparatus, it is preferable that the two recesses formed in the one shift groove are depressed in opposite directions in the axial direction.

According to the above structure, since the two shift forks that are engaged with the one shift groove are biased by the spring in the opposite directions, there is no adverse possibility that the shift fork is fitted to a recess into one transmission gear stage during a shifting operation into another transmission gear stage.

In the shift-drum apparatus, two of the shift forks that are engaged with different shift grooves are biased in opposite directions in the axial direction by one of the springs.

According to the above structure, since the two shift forks are biased in the opposite directions by the same spring, the number of parts such as the springs can be reduced and the costs can be reduced.

In the shift-drum apparatus, it is preferable that the plurality of transmission gear stages are a forward high speed stage, a forward low speed stage and a reverse stage, the number of the shift grooves is two and the number of shift forks is three, the shift fork for the forward high speed stage and the shift fork for the reverse stage are engaged with one of the shift grooves, and the shift fork for the forward low speed stage is engaged with the other shift groove.

According to the above structure, in the shift-drum apparatus capable of shifting the transmission gear stage to the forward two stages and the reverse stage, two shift grooves formed in the outer peripheral surface of the shift drum suffice, and the size of the shift drum in the axial direction is reduced.

The invention also provides a four wheeled vehicle having the gear-type transmission and the shift-drum apparatus, and the four wheeled vehicle includes an engine, and a V-belt continuously variable transmission that can transmit power between a crankshaft of the engine and an input shaft of the gear-type transmission. Preferably, the four wheeled vehicle includes, between the V-belt continuously variable transmission and the gear-type transmission, a centrifugal clutch that automatically transmits and cuts off power from the crankshaft.

The four wheeled vehicle having the above-described structure can obtain the same effects as those of the shift-drum apparatus.

It is more effective to apply the invention to a four wheeled vehicle having a centrifugal clutch between the V-belt continuously variable transmission and the crankshaft.

BRIEF DESCRIPTION OF THE DRAWINGS

The present invention having the above-described object, features, and effects will be described in detail based on the following drawings.

DETAILED DESCRIPTION OF THE PREFERRED EMBODIMENTS

FIGS. 1 to 12 show a shift-drum apparatus according to the present invention and a four wheeled utility vehicle having the shift-drum apparatus. Embodiment of the invention will be described based on the drawings.

Figure 1:
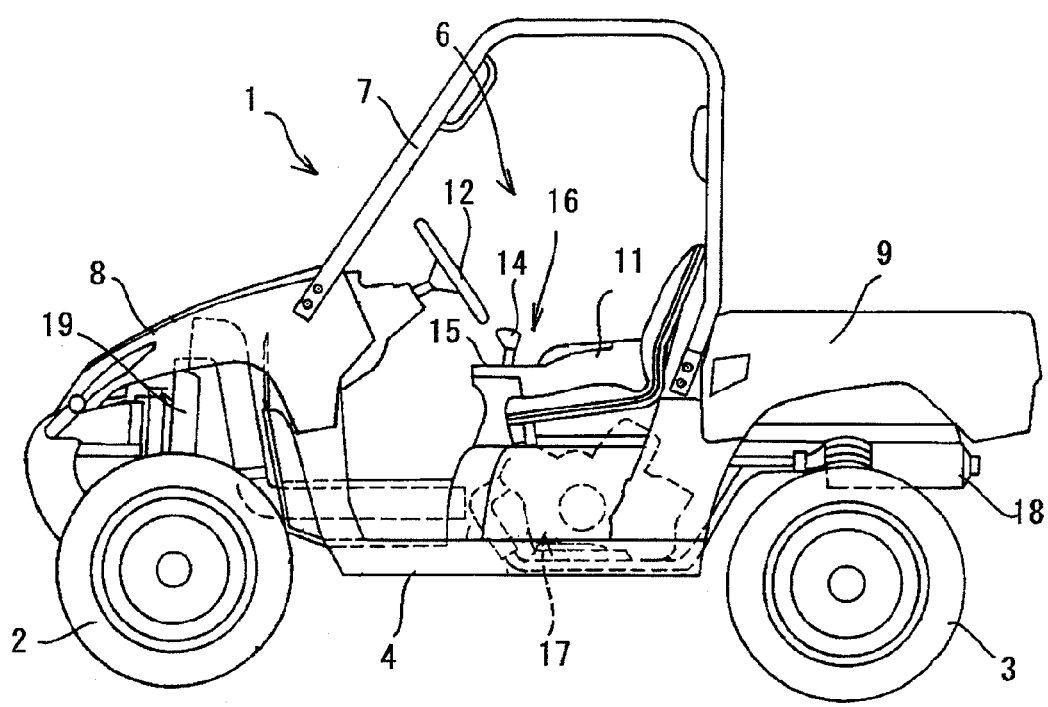
FIG. 1 is a left side view of a four wheeled vehicle having a shift-drum apparatus according to the invention.

FIG. 1 is a left side view of a four wheeled utility vehicle. The four wheeled vehicle includes a pair of left and right front wheels 2, a pair of left and right rear wheels 3, and a vehicle body 4 supported by the front wheels 2 and the rear wheels 3. A cabin frame 7 constituting a cabin 6 is provided at an intermediate portion in a longitudinal direction of the vehicle body 4, a hood (bonnet) 8 is provided in front of the cabin frame 7, and a cargo bed 9 is provided behind the cabin frame 7.

The four wheeled vehicle in this embodiment is a two-seated vehicle. A driver's seat 11 and a passenger's seat (not shown) are provided in the cabin 6, and a steering wheel 12 is disposed in front of the driver's seat 11. A shift operating unit 16 having a shift lever 14 and a shift gate 15 is provided on the side of the driver's seat. An engine 17 is provided below the shift operating unit 16 between the driver's seat 11 and the passenger's seat seat. An exhaust muffler 18 is disposed below the cargo bed 9, and a radiator 19 and other devices (not shown) are disposed in the hood (bonnet) 8.

Figure 2:
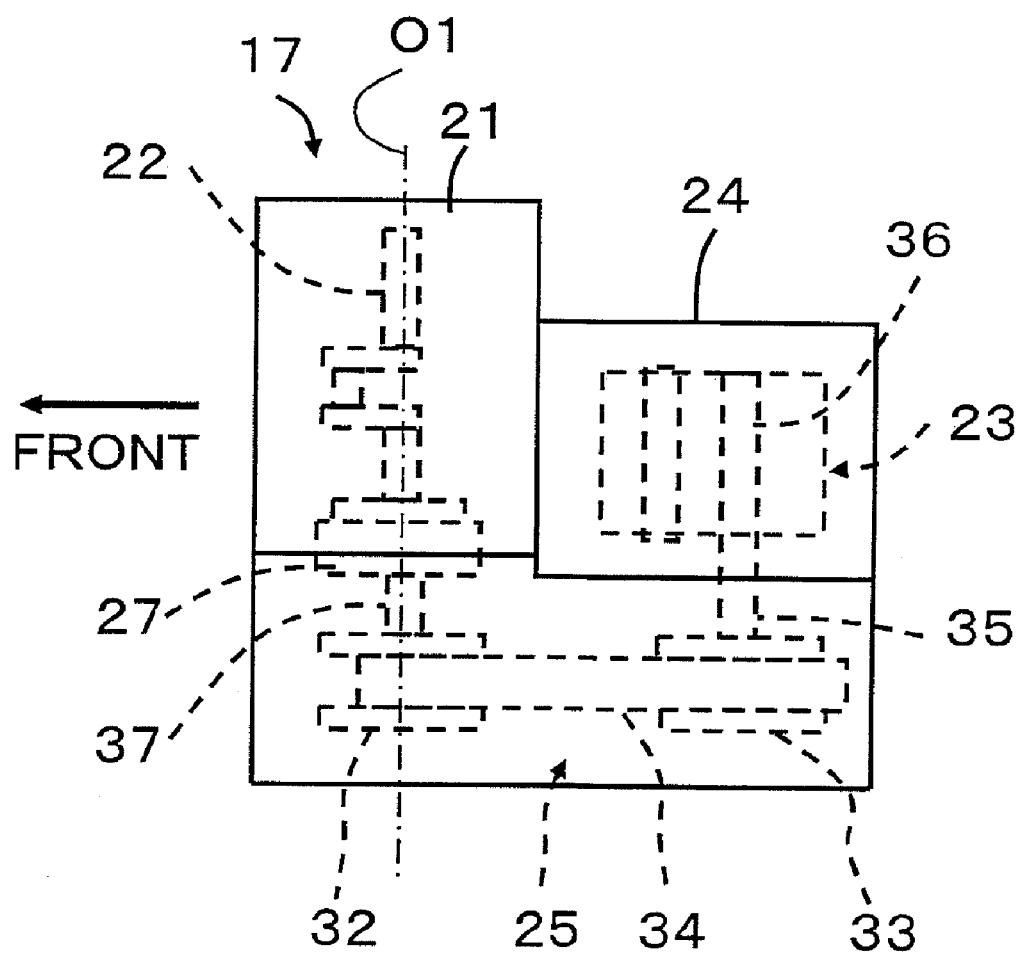
FIG. 2 is a plan view of an engine provided in the four wheeled vehicle shown in FIG. 1.

FIG. 2 is a schematic plan view of the engine 17 of the four wheeled vehicle shown in FIG. 1. The engine 17 includes a crank case 21 in which a crankshaft 22 is accommodated, and a transmission case 24 in which a gear-type transmission 23 is accommodated. A case 25 in which a V-belt continuously variable transmission 25 is accommodated is provided on one side surface of the crank case 21 and on one side surface of the crankshaft 22 of the transmission case 24 in its axial direction (direction of an axis O1). A centrifugal clutch 27 is provided on one end of the crankshaft 22.

The V-belt continuously variable transmission 25 includes a drive pulley 32 mounted on a drive shaft 31, a driven pulley 33 mounted on a rear driven shaft 35, and a V-belt 34 wound around both the pulleys 32 and 33. Sheave gaps constituting the pulleys 32 and 33 are automatically adjusted by variations of rotation speed and rotation torque and with this, gears are shifted in a stepless manner automatically as is known.

The drive shaft 31 of the V-belt continuously variable transmission 25 is connected to a downstream member of the centrifugal clutch 27 in terms of power flow, and the driven shaft 35 is integrally provided on an input shaft 36 of the gear-type transmission 23.

Figure 4:
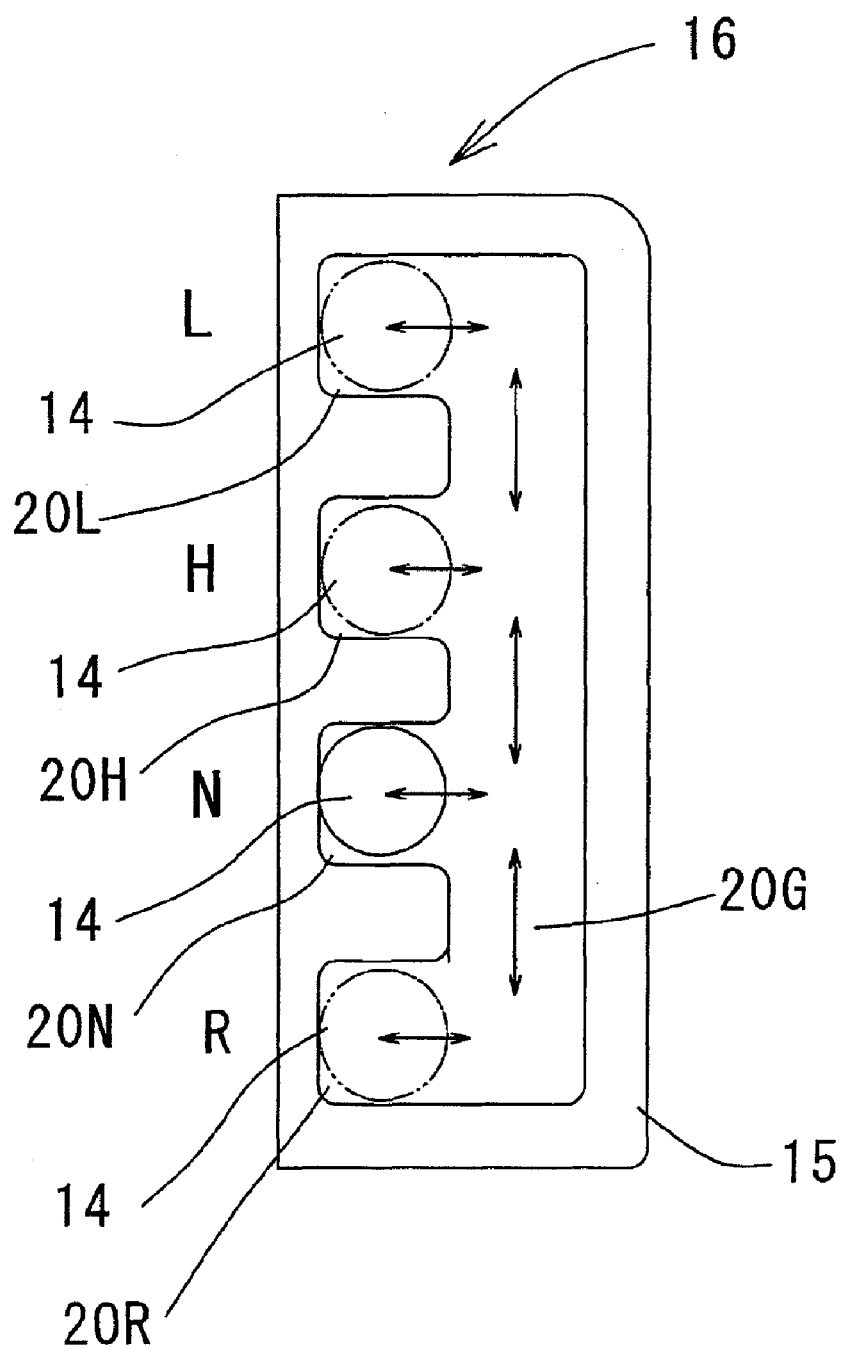
FIG. 4 is a plan view of a gate plate of a shift operating unit of the four wheeled vehicle shown in FIG. 1.

FIG. 4 is a plan view of the shift operating unit 16. A guide passage 20G extending substantially straight (or in a gentle arc form) is formed in the gate plate 15. A reverse recess 20R, a neutral recess 20N, a forward high speed recess 20H and a forward low speed recess 20L are provided substantially at equal distances from one another in a length direction of the guide passage 20G such that these recesses are in communication with the guide passage 20G in this order. The recesses 20R, 20N, 20H and 20L are depressed in a direction perpendicular to the length direction of the guide passage 20G. In FIG. 4, a neutral state where the shift lever 14 is fitted into the neutral recess 20N is shown with solid lines, and states where the shift lever 14 is fitted to other recesses 20H, 20L and 20R are shown with phantom lines.

The shift lever 14 is inserted into the guide passage 20G such that the shift lever 14 can move in the length direction of the guide passage 20G. The shift lever 14 is engaged with any one of the recesses 20R, 20N, 20H and 20L at a desired transmission gear stage.

Figure 3:
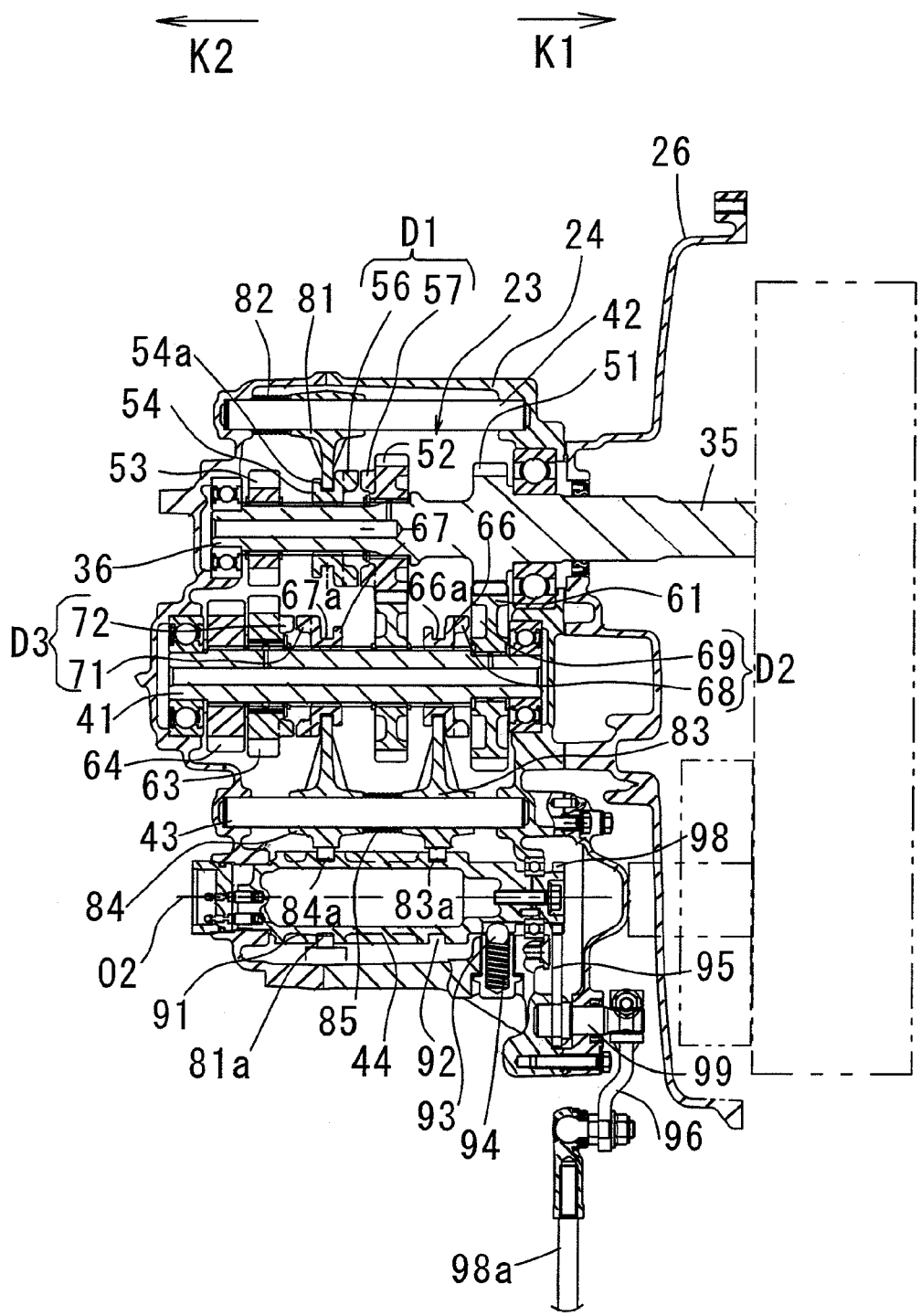
FIG. 3 is a sectional view of the engine shown in FIG. 2.

FIG. 3 is a sectional view of the transmission case 24 (sectional development view taken along a plane passing through each speed-change axis), and clearly shows a structure of the gear-type transmission 23. Disposed in the transmission case 24 are the gear-change input shaft 36, a gear-change output shaft 41, two shift fork support shafts 42 and 43, one shift drum 44 and a reverse idle shaft (not shown).

An input-side forward low speed gear 51, an input-side forward high speed gear 52 and an input-side reverse gear 53 are disposed in this order on the gear-change input shaft 36 from the side where the V-belt continuously variable transmission 25 is disposed ("arrow K1 side", hereinafter). A first shift sleeve 54 is disposed near the input-side forward high speed gear 52. The input-side forward low speed gear 51 is integrally formed on the gear-change input shaft 36, and the input-side forward high speed gear 52 is rotatably fitted to the gear-change input shaft 36 and is retained such that the input-side forward high speed gear 52 can not move in the axial direction. The input-side reverse gear 53 is spline-fitted to the gear-change input shaft 36 such that the input-side reverse gear 53 always rotates in unison with the gear-change input shaft 36, and the input-side reverse gear 53 is retained such that it can not move in the axial direction.

The first shift sleeve 54 is axially movably spline-fitted to the gear-change input shaft 36. An annular groove 54a is formed in an outer periphery of the first shift sleeve 54.

A first dog clutch D1 is provided between the first shift sleeve 54 and the input-side forward high speed gear 52. The first dog clutch D1 includes dog teeth 56 formed on a side surface of the first shift sleeve 54 and dog teeth 57 formed on a side surface of the input-side forward high speed gear 52. By coupling the first dog clutch D1, power can be transmitted between the gear-change input shaft 36 and the input-side forward high speed gear 52.

An output-side forward low speed gear 61, an output-side forward high speed gear 62, an output-side reverse gear 63 and an output gear 64 are disposed on the gear-change output shaft 41 from the arrow K1 side. A second shift sleeve 66 is disposed near the input-side forward low speed gear 61, and a third shift sleeve 67 is disposed near the output-side reverse gear 63. The output-side forward high speed gear 62 and the output gear 64 are spline-fitted to the gear-change output shaft 41 such that the gears always rotate in unison with the gear-change output shaft 41 and the gears are retained such that they can not move in the axial direction. The output-side forward low speed gear 61 and the output-side reverse gear 63 are rotatably fitted to the gear-change output shaft 41 and retained such that these gears can not move in the axial direction.

The second and third shift sleeves 66 and 67 are axially movably spline-fitted to the gear-change output shaft 41, and annular grooves 66a and 67a are formed in outer peripheral surfaces of the second and third shift sleeves 66 and 67, respectively.

The output-side forward low speed gear 61 always meshes with the input-side forward low speed gear 51. The output-side forward high speed gear 62 always meshes with the input-side forward high speed gear 52. The output-side reverse gear 63 always meshes with the input-side reverse gear 53 through a reverse idle gear (not shown). The output gear 64 is connected to a rear-wheel driving speed reducer (not shown) through a pinion, a bevel gear or the like (not shown).

A second dog clutch D2 is provided between the second shift sleeve 66 and the output-side forward low speed gear 61. The second dog clutch D2 includes dog teeth 68 formed on a side surface of the second shift sleeve 66, and a recess 69 formed in a side surface of the output-side forward low speed gear 61. A third dog clutch D3 is provided between the third shift sleeve 67 and the output-side reverse gear 63. The third dog clutch D3 includes dog teeth 71 formed on a side surface of the third shift sleeve 67, and dog teeth 72 formed on a side surface of the output-side reverse gear 63. By coupling the second dog clutch D2, power can be transmitted between the output-side forward low speed gear 61 and the gear-change output shaft 41. By coupling the third dog clutch D3, power can be transmitted between the output-side reverse gear 63 and the gear-change output shaft 41.

A forward high speed first shift fork 81 is axially movably fitted to the first shift fork support shaft 42. A coil spring 82 that biases the first shift fork 81 toward the arrow K1 side is compressed between the first shift fork 81 and a sidewall of the transmission case 24. An arc fork portion of the first shift fork 81 is engaged with an outer peripheral annular groove 54a of the first shift sleeve 54 on the gear-change input shaft 36.

A forward low speed second shift fork 83 and a reverse third shift fork 84 are axially movably fitted to the second shift fork support shaft 43. A common coil spring 85 is compressed between the first shift fork 83 and the second shift fork 84. The common coil spring 85 biases the second shift fork 83 toward the arrow K1 side, and biases the third shift fork 84 toward an arrow K2 side (opposite direction from the arrow K1 side). An arc fork portion of the second shift fork 83 is engaged with an outer peripheral annular groove 66a of the second shift sleeve 66, and an arc fork portion of the third shift fork 84 is engaged with an outer peripheral annular groove 67a of the third shift sleeve 67.

A first shift groove 91 and a second shift groove 92 are formed in an outer peripheral surface of the shift drum 44 in this order from the arrow K2 side. A drive pin 81a of the first shift fork 81 and a drive pin 84a of the third shift fork 84 are engaged with the first shift groove 91. That is, the drive pins 81a and 84a of the two shift forks 81 and 84 are engaged with the one first shift groove 91. A drive pin 83a of the second shift fork 83 is engaged with the second shift groove 92. Although the first shift fork 81 and the drive pin 81a are formed into one piece, since FIG. 3 is the development view, the first shift fork 81 and the drive pin 81a are illustrated as members separated from each other on the drawing.

A detent mechanism for holding the shift drum 44 at a predetermined rotating position is provided on an end of the shift drum 44 on one side in the axial direction (axial direction O2), i.e., in the direction of the arrow K1. The detent mechanism includes a detent ball 93 and a coil spring 94 that biases the detent ball 93 against the outer peripheral surface of the shift drum 44. A drive gear 98 for rotating the shift drum 44 is provided on an end of the shift drum 44 closer to the arrow K1 side than the detent mechanism. The drive gear 98 meshes with a sector rocking gear (sector gear) 95. By rocking or swinging the rocking gear 95, the shift drum 44 is rotated a predetermined angle by predetermined angle through the drive gear 98. The rocking gear 95 is connected to an input lever 96 disposed outside the transmission case 24 through a shaft 99. The input lever 96 is connected to the shift lever 14 shown in FIG. 4 through a connecting rod 98a.

Figure 5:
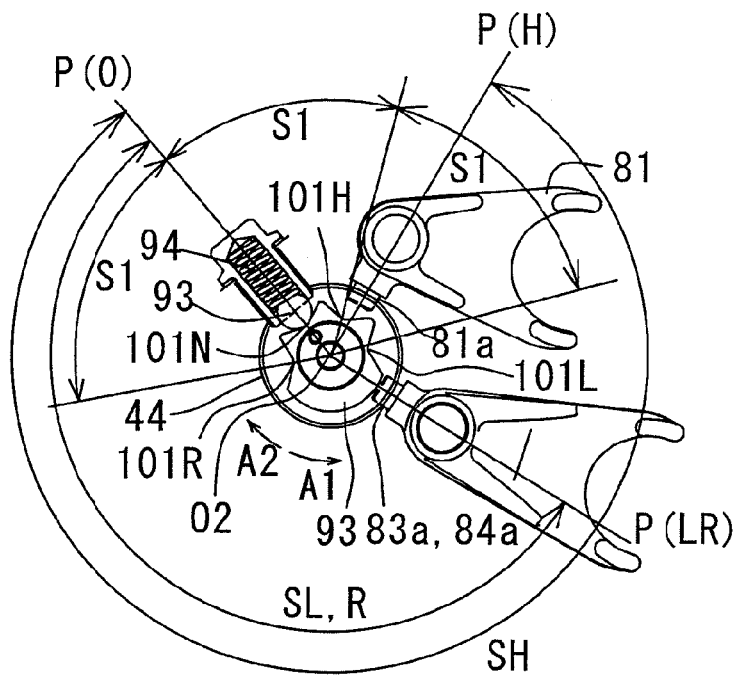
FIG. 5 is a side view of a shift drum and two shift forks in a neutral state.

FIG. 5 is a side view of the shift drum 44 in its neutral state, the first, second and third shift forks 81, 83 and 84, and the detent mechanism as viewed from the axial direction of the shift drum 44. A reverse recess 101R, a neutral recess 101N, a forward high speed recess 101H and a forward low speed recess 101L are formed in this order in an outer peripheral surface of an end of the shift drum 44 in the axial direction. These recesses are formed as positioning recesses into which the detent ball 93 can be fitted, and these recesses are separated from one another through substantially equal rotating angles S1 (e.g., 60°).

That is, the shift drum 44 is rotated in a direction of an arrow A1 or A2, and the detent ball 93 is sequentially fitted into the recesses 101R, 101N, 101H and 101L. With this, the shift drum 44 is retained and held at a reverse position, a neutral position, a forward high speed position and a forward low speed position.

If a position of the detent ball 93 in a circumferential direction of the shift drum 44 is defined as a reference position P(0), the drive pin 83a of the forward low speed second shift fork 83 and the drive pin 84a of the reverse third shift fork 84 are disposed at positions P(L, R) away from the reference position P(0) by the same rotating angles SL and R in the direction of the arrow A1. The drive pin 81a of the forward high speed first shift fork 81 is disposed at a position P(H) of the rotating angle SH that is greater than the rotating angles SL and R away from the reference position P(0) in the direction of the arrow A1.

Figure 6:
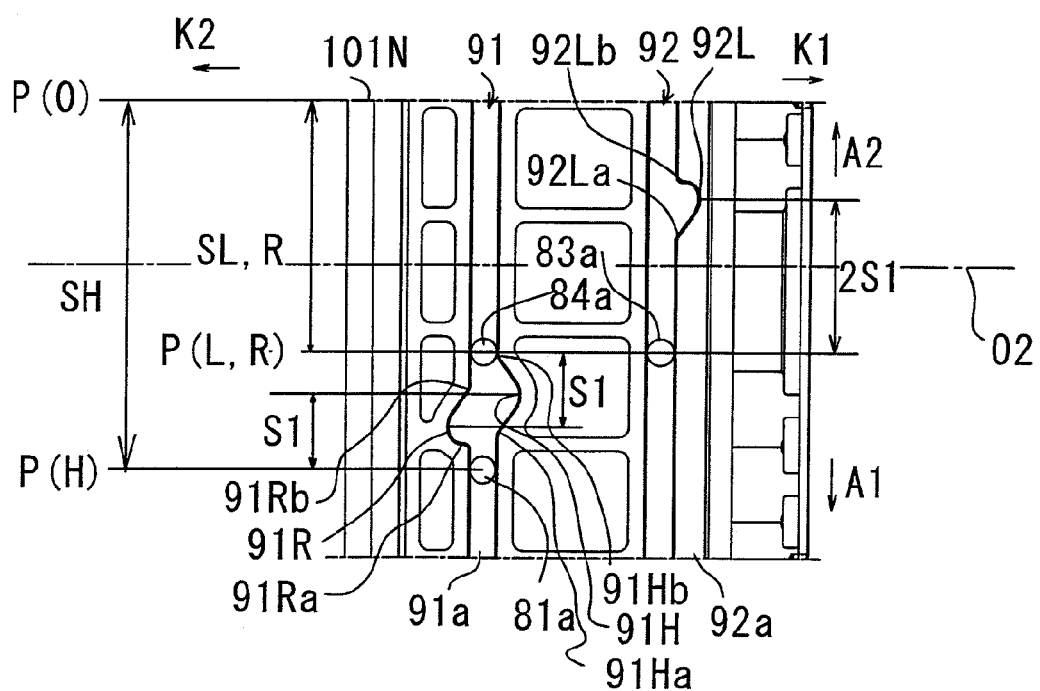
FIG. 6 is a development view of an outer peripheral surface of the shift drum in the neutral state.

FIG. 6 is a development view of an outer peripheral surface of the shift drum 44 in its neutral state. As described above, the drive pins 83a and 84a of the second and third shift forks 83 and 84 are disposed at positions of the same rotating angles SL and R in the direction of the arrow A1 from the reference position P(0) in the circumferential direction of the shift drum 44. The drive pin 81a of the forward high speed first shift fork 81 and the reverse third drive pin 84a are disposed at positions corresponding to the first shift groove 91 in the axial direction of the shift drum 44. The drive pin 83a of the forward low speed second shift fork 83 is disposed at a position corresponding to the second shift groove 92 in the axial direction (axial direction O2) of the shift drum 44.

The first shift groove 91 includes a passage portion 91a and two first and third recesses 91H and 91R.

The passage portion 91a does not bend in the axial direction of the shift drum 44 and extends straightly along the circumferential direction of the shift drum 44.

The first recess 91H is for forward high speed, the first recess 91H is formed at a position away from the position P(H) of the drive pin 81a of the first shift fork 81 by the rotating angle S1 in the direction of an arrow A2 in the circumferential direction of the shift drum 44. The first recess 91H is depressed toward one side of the axial direction (axial direction O2) of the shift drum 44, i.e., in the direction of the arrow K1. The third recess 91R is for reverse, and is formed at a position away from the positions PL and R of the drive pin 84a of the third shift fork 84 by the rotating angle S1 in the direction of the arrow A1 in the circumferential direction of the shift drum 44. The third recess 91R is depressed toward the other end of the axial direction (axial direction O2) of the shift drum 44, i.e., in the direction of the arrow K2.

The first recess 91H has an end 91Ha in the direction of the arrow A1 and an end 91Hb in the direction of the arrow A2, and these ends are connected to the passage portion 91a through gentle inclined surfaces. An end 91Rb of the third recess 91R in the direction of the arrow A2 is connected to the passage portion 91a through a gentle inclined surface, and an end 91Ra of the third recess 91R in the direction of the arrow A1 is connected to the passage portion 91a through a substantially perpendicular surface.

The second shift groove 92 includes a passage portion 92a and one second recess 92L. The passage portion 92a extends straightly along the circumferential direction of the shift drum 44 without bending in the axial direction of the shift drum 44. The second recess 92L is for forward low speed. The second recess 92L is formed at a position away from the positions PL and R of the drive pin 83a of the second shift fork 83 by a rotating angle 2S1 in the direction of the arrow A2 in the circumferential direction of the shift drum 44. The second recess 92L is depressed in the direction of the arrow K1 of the axial direction of the shift drum 44.

An end 92La of the second recess 92L is connected to the passage portion 92a through a gentle inclined surface, and an end 92Lb of the second recess 92L in the direction of the arrow A2 is connected to the passage portion 92a substantially perpendicularly.

As described above, the first drive pin 81a is biased toward the arrow K1 (toward the first recess 91H) by the coil spring 82 shown in FIG. 3. The second drive pin 83a is biased toward the arrow K1 (toward the second recess 92L) by the coil spring 85 (FIG. 3). The third drive pin 84a is biased toward the arrow K2 (toward the third recess 92R) by the coil spring 85.

[When the Engine Starts and when the Engine Idles]

A shifting operation and action will be described.

In FIG. 4, when the engine starts, the shift lever 14 is located in the neutral recess 20N. In FIG. 2, the centrifugal clutch 27 is in its disengaged state until the idling state after the engine started. Therefore, the V-belt continuously variable transmission 25 and the gear-type transmission 23 are maintained in their stopped state. The vehicle is also in the stopped state of course.

[Start in Forward High Speed State]

In FIG. 4, when a vehicle starts from the forward high speed position, the shift lever 14 is moved from the neutral recess 20N to the forward high speed recess 20H through the guide passage 20G.

By moving the shift lever 14, the shift drum 44 rotates a predetermined angle through the connecting rod 98a, the input lever 96, rocking gear 95 and the drive gear 98 shown in FIG. 3. That is, the shift drum 44 rotates in the direction of the arrow A1 from the neutral position shown in FIG. 5 to the forward high speed position shown in FIG. 7 through a rotating angle S1, and the detent ball 93 is engaged with the forward high speed recess 101H.

Figure 8:
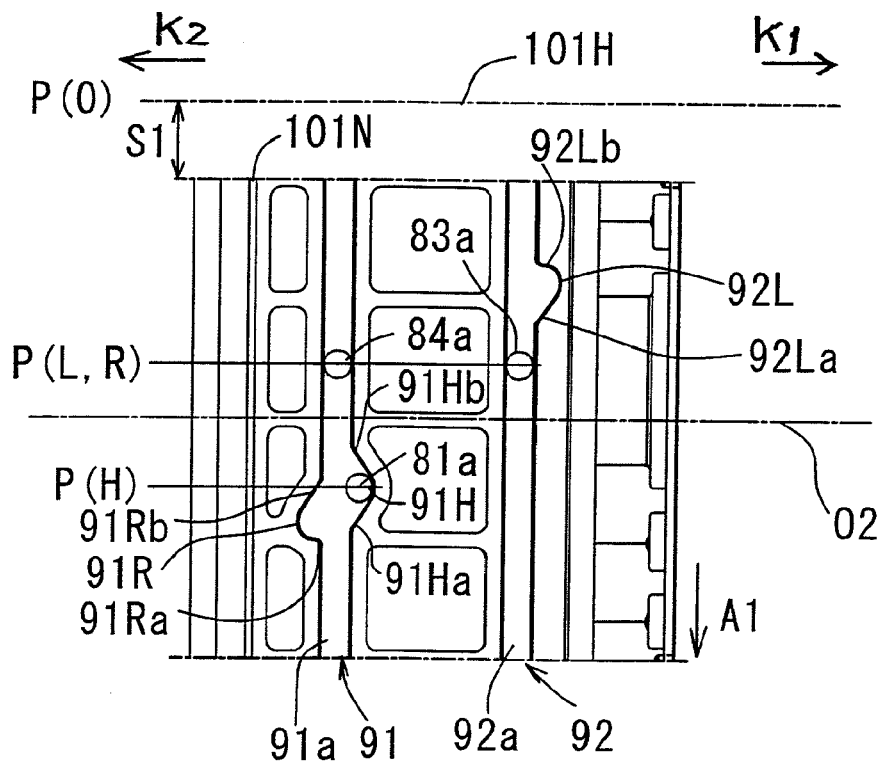
FIG. 8 is a development view of the outer peripheral surface of the shift drum in the forward high speed state.

In FIG. 8, if the shift drum 44 rotates in the direction of the arrow A1 through the rotating angle S1, the forward high speed first recess 91H of the first shift groove 91 moves in the passage portion 91a to the position P(H) corresponding to the drive pin 81a of the first shift fork 81. By the biasing force of the coil spring 82 shown in FIG. 3, the first shift fork 81 moves in the direction of the arrow K1, and the drive pin 81a is fitted into the forward high speed first recess 91H as shown in FIG. 8.

In FIG. 3, the first shift sleeve 54 moves in the direction of the arrow K1 by the movement of the shift fork 81 in the direction of the arrow K1, and the first dog clutch D1 is engaged. That is, power can be transmitted from the gear-change input shaft 36 to the input-side forward high speed gear 52 through the first dog clutch D1.

If the shifting operation to the forward high speed is completed and the number of revolutions of the engine is increased, the centrifugal clutch 27 is engaged, the power of the engine 17 is transmitted to the input-side forward high speed gear 52 through the centrifugal clutch 27, the V-belt continuously variable transmission 25, the gear-change input shaft 36 and the first dog clutch D1.

Further, the power is transmitted to the rear wheels shown in FIG. 1 through the output-side forward high speed gear 62, the gear-change output shaft 41, the output gear 64 and a driveline (not shown).

Figure 7:
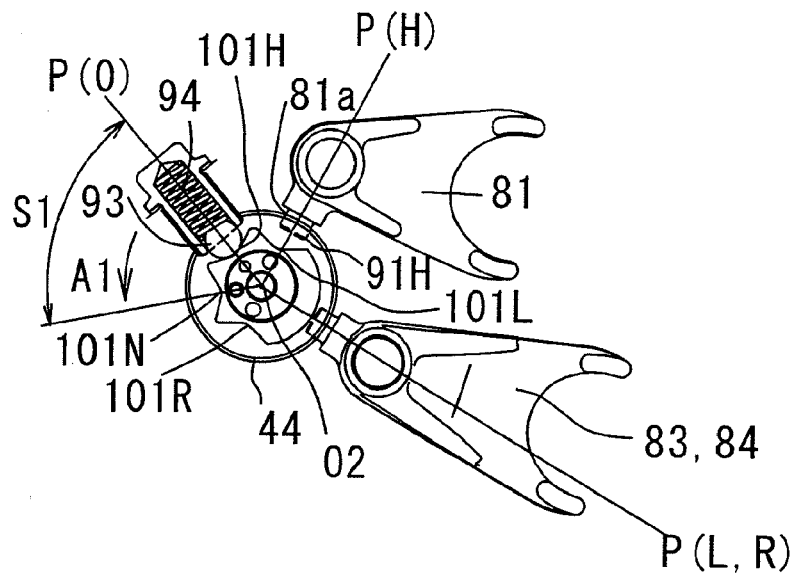
FIG. 7 is a side view of the shift drum and the two shift forks in a forward high speed state.

As shown in FIG. 7, when the shift drum 44 rotates to the forward high speed position and the first recess 91H of the first shift groove 91 moves to a position corresponding to the drive pin 81a, tip ends of the dog teeth 56 and 57 of the first dog clutch D1 in FIG. 3 abut against each other in some cases. In such a case, movement of the first shift sleeve 54 in the direction of the arrow K1 is temporarily stopped, and the first dog clutch D1 is maintained in its disengaged state. That is, the first dog clutch D1 is brought into the standby state. Next, if the input-side forward low speed gear 51 and the first shift sleeve 54 relatively rotate and thus the relative position of both the dog teeth 56 and 57 becomes normal, the first dog clutch D1 is automatically engaged by elasticity of the coil spring 82.

[Start in Forward Low Speed State]

The vehicle starts up a hill in a forward low speed state. In FIG. 4, the shift lever 14 is moved to the forward low speed recess 20L from the neutral recess 20N through the guide passage 20G.

Figure 9:
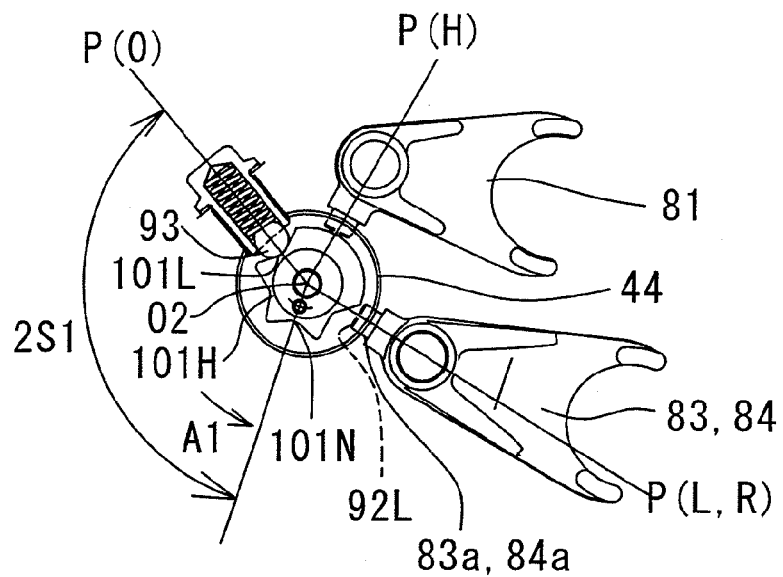
FIG. 9 is a side view of the shift drum and the two shift forks in a forward low speed state.

By moving the shift lever 14, the shift drum 44 rotates from the neutral position in FIG. 5 to the forward low speed position in FIG. 9 by a rotating angle 2S1 in the direction of the arrow A1 through the connecting rod 98a, the input lever 96, the rocking gear 95 and the drive gear 98 shown in FIG. 3, and the detent ball 93 is engaged with the forward low speed recess 101L.

When the shift drum 44 rotates the rotating angle S2 in the direction of the arrow A1 as described above, the first recess 91H of the first shift groove 91 is not engaged with the forward high speed first drive pin 81a and passes through the position of the first drive pin 81a. That is, the shift drum 44 can be shifted to the forward low speed position without shifting to the forward high speed position halfway. In other words, a skipping function is exhibited.

Figure 10:
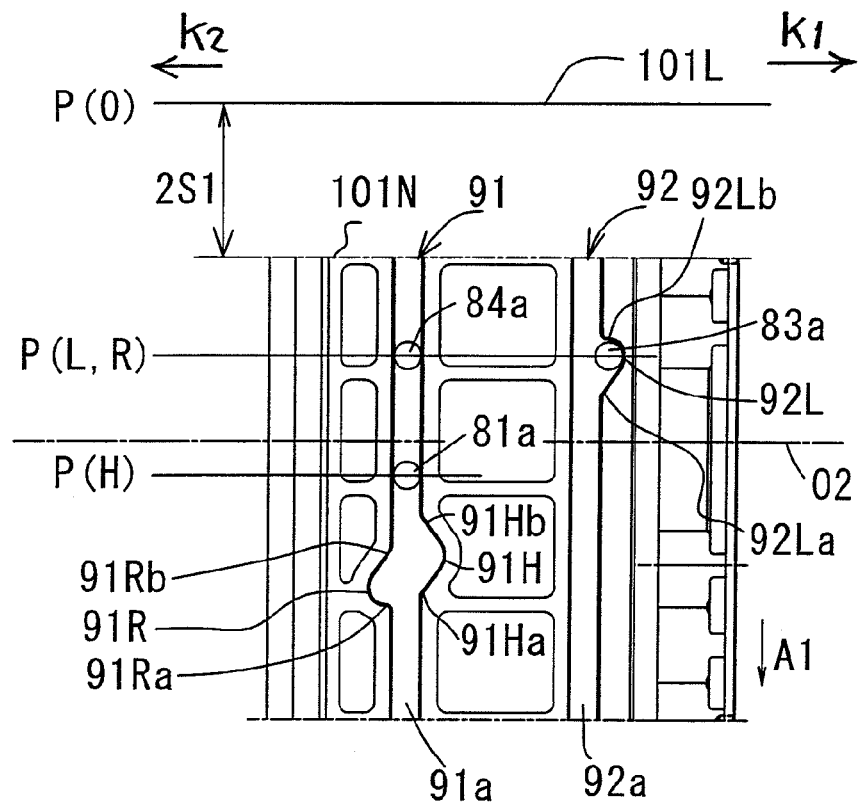
FIG. 10 is a development view of the outer peripheral surface of the shift drum in the forward low speed state.

In FIG. 10, if the shift drum 44 rotates the rotating angle 2S1 in the direction of the arrow A1, the forward low speed second recess 92L of the second shift groove 92 moves to the positions PL and R corresponding to the drive pin 83a of the second shift fork 83. The second shift fork 83 moves in the direction of the arrow K1 by the biasing force of the coil spring 85 shown in FIG. 3, and the drive pin 83a of the second shift fork 83 is fitted into the forward low speed recess 92L. That is, the second shift sleeve 66 also moves toward the arrow K1, the second dog clutch D2 is engaged, and power can be transmitted from the gear-change input shaft 36 to the input-side forward low speed gear 51 through the second dog clutch D2.

In this state, if the number of rotations of the engine increases, the centrifugal clutch 27 is engaged, and power of the engine 17 is transmitted to the input-side forward low speed gear 51 through the centrifugal clutch 27, the V-belt continuously variable transmission 25, the gear-change input shaft 36 and the second dog clutch D2.

Further, the power is transmitted to the rear wheels shown in FIG. 1 through the output-side forward low speed gear 61, the gear-change output shaft 41, the output gear 64 and the driveline (not shown).

When the shift drum 44 rotates to the forward low speed position and the second recess 92L of the second shift groove 92 moves to a position corresponding to the drive pin 83a as shown in FIG. 9, the dog teeth 68 of the second dog clutch D2 and wall surfaces between the recess 69 abut against each other in FIG. 3, in some cases as in the forward high speed procedure. In this case, the movement of the second shift sleeve 66 in the direction of the arrow K1 is temporarily stopped, and the disengaged state of the second dog clutch D2 is maintained. That is, the second dog clutch D2 is brought into the standby state. Next, if the number of rotations of the crankshaft 22 increases and the centrifugal clutch 27 is engaged, the output-side forward low speed gear 51 and the second shift sleeve 66 relatively rotate, the relative position between the dog teeth 68 and the recess 69 becomes normal and the second dog clutch D2 is automatically engaged by the elastic force of the spring 85.

[Start in Reverse State]

In FIG. 4, when the vehicle starts in the reverse state, the shift lever 14 is moved from the neutral recess 20N to the reverse recess 20R through the guide passage 20G.

Figure 11:
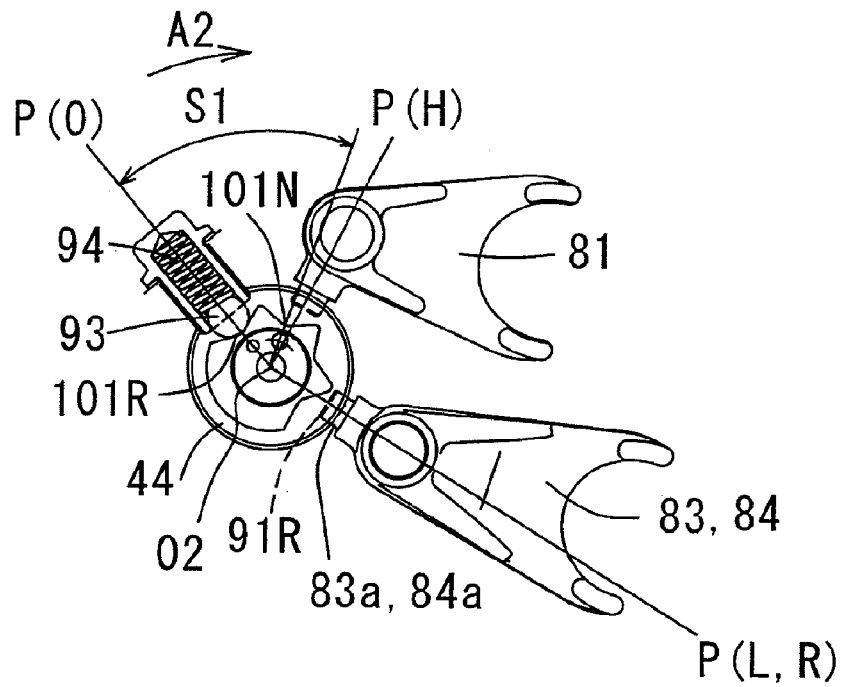
FIG. 11 is a side view of the shift drum and the two shift forks in a reverse state.

By moving the shift lever 14, the shift drum 44 rotates the rotating angle S1 in the direction of the arrow A2 from the neutral position shown in FIG. 5 to the reverse position shown in FIG. 11 through the connecting rod 98a, the input lever 96, the rocking gear 95 and the drive gear 98 shown in FIG. 3, and the detent ball 93 is engaged with the reverse recess 101R.

Figure 12:
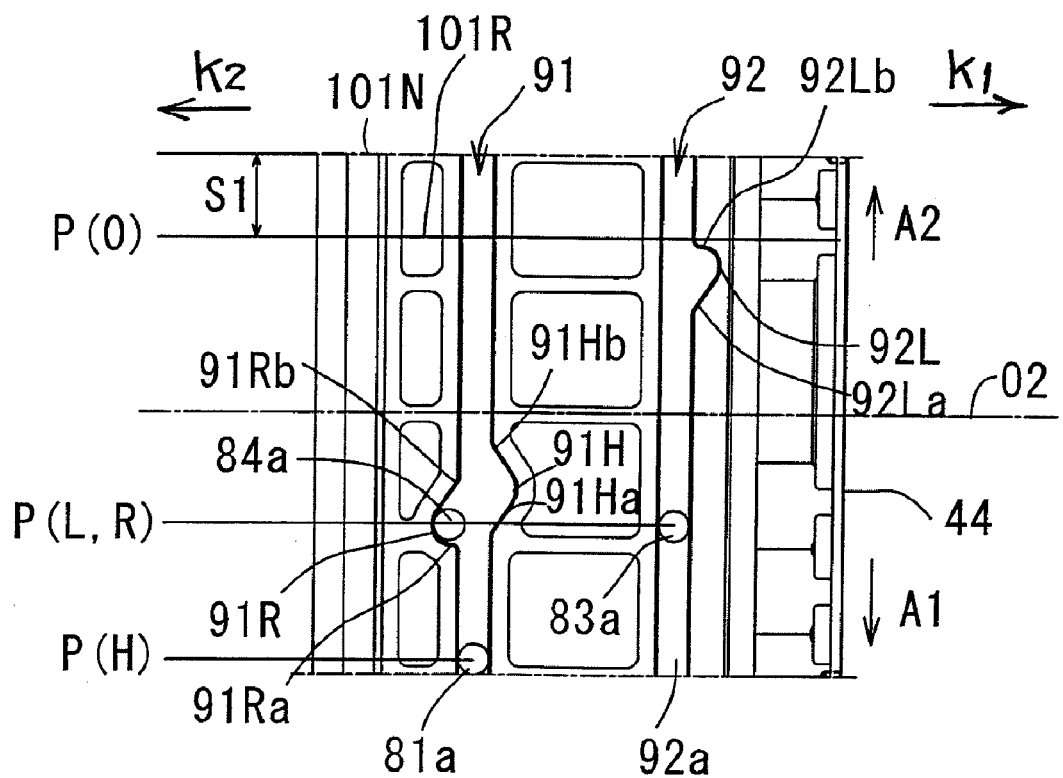
FIG. 12 is a development view of the outer peripheral surface of the shift drum in the reverse state.
Figure 13:
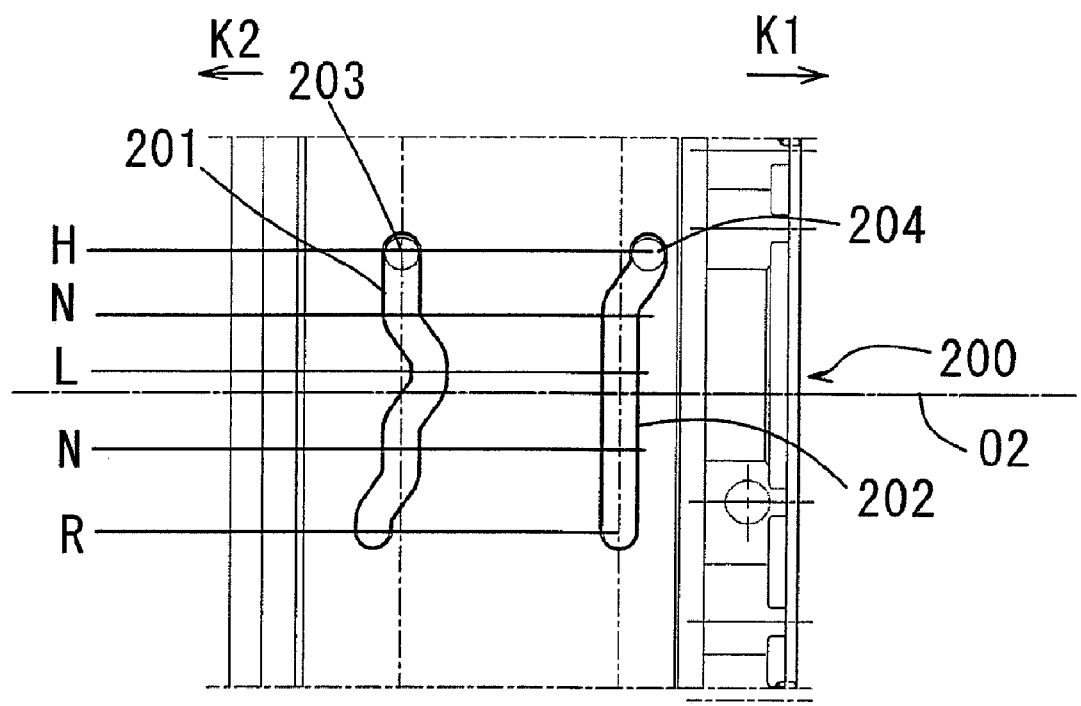
FIG. 13 is a development view of a conventional shift drum.
Figure 14:
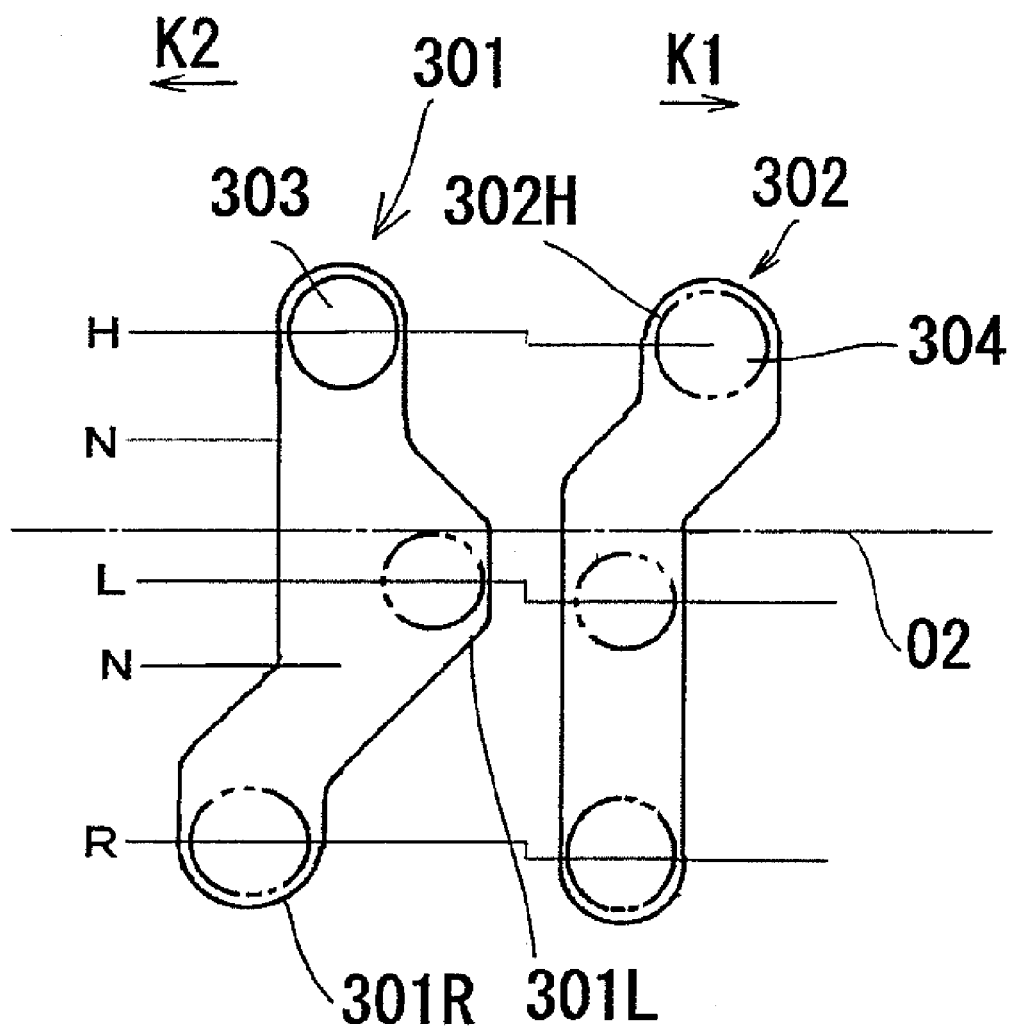
FIG. 14 is a development view of another conventional shift drum.

In FIG. 12, if the shift drum 44 rotates the rotating angle S1 in the direction of the arrow A2, the reverse third recess 91R of the first shift groove 91 moves to the positions P and R corresponding to the drive pin 84a of the third shift fork 84. The third shift fork 84 is moved in the direction of the arrow K2 by the biasing force of the coil spring 85 shown in FIG. 3, and the drive pin 84a is fitted into the reverse third recess 91R.

By moving the second shift fork 84 in the direction of the arrow K2, the third shift sleeve 67 moves in the direction of the arrow K2, and the third dog clutch D3 is engaged. With this, power can be transmitted from the gear-change input shaft 36 to the input-side reverse gear 53 through the third dog clutch D3.

In this state, if the number of rotations of the crankshaft 22 increases and the centrifugal clutch 27 is engaged, the power of the engine 17 is transmitted to the input-side reverse gear 53 through the centrifugal clutch 27, the V-belt continuously variable transmission 25, the gear-change input shaft 36 and the third dog clutch D3.

Further, the power is transmitted to the rear wheels shown in FIG. 1 through the reverse idle gear (not shown), the output-side reverse gear 63, the gear-change output shaft 41, the output gear 64 and the driveline (not shown).

As shown in FIG. 11, when the shift drum 44 rotates to the reverse position and the third recess 91R of the first shift groove 91 moves to the positions PL and R corresponding to the drive pin 84a, tip ends of the dog teeth 71 and 72 of the third dog clutch D3 shown in FIG. 3 abut against each other in some cases. In this case, the movement of the third shift sleeve 67 in the direction of the arrow K2 is temporarily stopped, and the third dog clutch D3 is maintained in its disengaged state. That is, the third dog clutch D3 is brought into the standby state. Next, if the output-side reverse gear 63 and the third shift sleeve 67 relatively rotate, the relative positions of both the dog teeth 71 and 72 become normal, and the third dog clutch D3 is automatically engaged by the elastic force of the coil spring 85.

When the drive pins 81a, 83a and 84a are pulled out from the first recess 91H, the second recess 92L and the third recess 91R, these pins are pulled out into the passage portions 91a and 92a through the gentle inclined surfaces of the recesses 91H, 92L and recess 91R. Therefore, a light shifting operation can be secured.

(1) In all of the transmission gear stages, i.e., the forward high speed stage, the forward low speed stage and the reverse stage, the waiting function utilizing the recesses 91H, 92L and 91R and the coil springs 82 and 85 acting in the axial direction is exhibited Therefore, no matter which transmission gear stage a driver selects and even if the tip ends of the dog teeth abut against each other, the dog clutches D1, D2 and D3 are automatically engaged by the light shifting operation, and the shifting operation is smoothly completed.

(2) The two gear-shifting recesses 91H and 91R are formed in the first shift groove 91, and the drive pins 81a and 84a of the two shift forks 81 and 84 are engaged. Therefore, the number of shift grooves formed in the outer peripheral surface of the shift drum 44 becomes smaller than the number of transmission gear stages and with this, the size of the shift drum 44 in its axial direction can be reduced. Further, since the two shift forks 81 and 84 are engaged with the one shift groove 91, the rotating angle S1 of the shift drum 44 at the time of the shift operations can be set substantially uniformly, and the gear can be shifted to any of the transmission gear stages with the same stroke, and the shifting operation becomes comfortable. That is, the rotating angle of the shift drum 44 in shifting operation does not become greater than a rotating angle of another shifting operation, and the operating load is not increased.

(3) Since the second shift fork 83 and the third shift fork 84 are respectively biased in the direction K1 and the direction K2 by the one coil spring 85, the number of biasing coil springs can be reduced.

(1) Although the shift-drum apparatus can shift the three stages, i.e., the forward high speed position, the forward low speed position and the reverse position in the above embodiment, a shift-drum apparatus having three or more forward speed positions, and a shift apparatus having no reverse position also fall within the scope of the present invention.

(2) In the above embodiment, the centrifugal clutch and the V-belt continuously variable transmission are disposed between the crankshaft and the gear-change input shaft of the gear-type transmission, but the centrifugal clutch may be omitted, and the V-belt continuously variable transmission itself may have the clutch function.

(3) In the shift drum having two shift grooves, two shift forks may be engaged with each shift groove.

(4) Although FIG. 1 shows the two-seated four wheeled vehicle, the present invention can also be applied to a four-seated four wheeled vehicle. Further, the invention is not limited to the four wheeled vehicle and the invention can also be applied a six wheeled vehicle and the like.

What is claimed is:

1. A shift-drum apparatus for a gear transmission comprising a shift drum provided at its outer peripheral surface with a plurality of shift grooves, and a plurality of shift forks that are respectively engaged with the shift grooves while being moved in an axial direction of a shift drum shaft by rotation of the shift drum, in which a plurality of dog clutches of the gear transmission are engaged or disengaged by movement of each of the shift forks, and a state of the gear transmission is shifted between a neutral state and a plurality of transmission gear stages, wherein:
   the number of the shift forks is the same as the number of the transmission gear stages,
   each of the shift grooves includes a passage portion extending along a circumferential direction of the shift drum, and one or more gear-shifting recesses that are depressed from the passage portion in an axial direction of the shift drum,
   the shift forks are biased in the axial direction respectively by springs toward the corresponding gear-shifting recesses, and
   two of the gear shifting recesses are formed in at least one of the plurality of shift grooves, while two of the shift forks are engaged with the shift groove.

2. The shift-drum apparatus according to claim 1, wherein the two recesses formed in the one shift groove are depressed in opposite directions in the axial direction.

3. The shift-drum apparatus according to claim 1, wherein two of the shift forks that are engaged with different shift grooves among the plurality of shift grooves are biased in opposite directions in the axial direction by one of the springs.

4. The shift-drum apparatus according to claim 1, wherein the plurality of transmission gear stages are a forward high speed stage, a forward low speed stage and a reverse stage,
   the number of the shift grooves is two and the number of shift forks is three, the shift fork for the forward high speed stage and the shift fork for the reverse stage are engaged with one of the shift grooves, and the shift fork for the forward low speed stage is engaged with the other shift groove.

5. A four wheeled vehicle comprising:
   the shift-drum apparatus according to claim 1, an engine, and a V-belt continuously variable transmission that can transmit power between a crankshaft of the engine and an input shaft of the gear transmission.

6. The four wheeled vehicle according to claim 5, further comprising, between the V-belt continuously variable transmission and the crankshaft, a centrifugal clutch that automatically transmits and cuts off power from the crankshaft.

* * * * *